(12) United States Patent
Tu et al.

(10) Patent No.: US 7,885,429 B2
(45) Date of Patent: Feb. 8, 2011

(54) STANDOFF DETECTION SYSTEMS AND METHODS

(75) Inventors: Peter Henry Tu, Niskayuna, NY (US); Kai Erik Thomenius, Clifton Park, NY (US); Nils Oliver Krahnstoever, Schenectady, NY (US); Jens Rittscher, Ballston Lake, NY (US); John Charles Hill, Jr., Georgetown, MA (US); Gianfranco Doretto, Albany, NY (US); Thomas Baby Sebastian, Flemington, NJ (US); Jeffrey Michael Ashe, Gloversville, NY (US)

(73) Assignee: General Electric Company, Niskayuna, NY (US)

( * ) Notice: Subject to any disclaimer, the term of this patent is extended or adjusted under 35 U.S.C. 154(b) by 915 days.

(21) Appl. No.: 11/759,683

(22) Filed: Jun. 7, 2007

(65) Prior Publication Data

US 2007/0286460 A1    Dec. 13, 2007

Related U.S. Application Data

(60) Provisional application No. 60/811,860, filed on Jun. 8, 2006.

(51) Int. Cl.
*G06K 9/00*    (2006.01)
*G01P 21/00*    (2006.01)

(52) U.S. Cl. .......................... 382/103; 382/291; 702/85

(58) Field of Classification Search ................. 382/100, 382/103, 106, 107, 115–118, 132, 168, 181, 382/189, 203, 232, 254, 274, 276, 291, 305, 382/312; 342/22; 250/559.39; 702/85; 378/86
See application file for complete search history.

(56) References Cited

U.S. PATENT DOCUMENTS

| | | | |
|---|---|---|---|
| 6,094,472 A * | 7/2000 | Smith .......................... | 378/86 |
| 6,967,612 B1 * | 11/2005 | Gorman et al. ............... | 342/22 |
| 7,501,646 B2 * | 3/2009 | Ross et al. ............. | 250/559.39 |
| 2005/0071105 A1 * | 3/2005 | Welles et al. .................. | 702/85 |

FOREIGN PATENT DOCUMENTS

| WO | WO03/067884 A1 | 8/2003 |
|---|---|---|
| WO | WO2005056620 A2 | 9/2005 |
| WO | WO2006056190 A2 | 5/2006 |

OTHER PUBLICATIONS

Co-pending U.S. Appl. No. 11/478,049, filed Jun. 27, 2006, entitled Method and System for Performing Image Re-Identification.
PCT International Search Report dated Jul. 27, 2008.

* cited by examiner

*Primary Examiner*—Seyed Azarian
(74) *Attorney, Agent, or Firm*—Joseph J. Christian

(57) ABSTRACT

Embodiments of the invention include a system and a method for determining whether a person is carrying concealed contraband, such as an improvised explosives device or other weapon. The system includes a people tracking video subsystem, a people tracking decisioning subsystem, a concealed contraband detection aiming subsystem, and a concealed contraband detection decisioning subsystem.

24 Claims, 2 Drawing Sheets

STANDOFF DETECTION SYSTEMS AND METHODS

The present patent application claims priority from provisional patent application Ser. No. 60/811,860, filed Jun. 8, 2006, the disclosure of which is hereby incorporated by reference in its entirety.

BACKGROUND

The invention generally relates to systems and methods for determining whether an individual is concealing some form of contraband (i.e., a weapon, an explosives device, or a concealed object such as a stolen object, for example), and more particularly, to a standoff detection system and method for determining whether an individual constitutes a threat.

There are numerous locations worldwide in which there is a need for security personnel to process and screen individuals to ascertain if they pose a threat for, for example, carrying a concealed weapon. Examples include access points to various public places such as mass transit locations like subways, train stations or airports; museums; sporting arenas; universities and other schools of higher learning; public schools at the high school and lower level; governmental buildings; office buildings; and the like. Other examples include checkpoints in regions in the midst of political or military turmoil, such as, for example, border checkpoints between Israel and Lebanon or elsewhere in the Middle East.

Personnel at such access points or checkpoints are exposed to danger because of the potential presence of concealed weapons, such as explosives like improvised explosive devices (IEDs), worn under an individual's clothing. Initial efforts at ascertaining whether an individual is wearing an IED have focused on passive imaging. Specifically, initial efforts have been focused on imaging the radiometric temperature of a targeted individual. The image formation process is relatively noisy, but generally will gain from increased dwell times. The dwell times, however, are limited by motion from the targeted individual. Also, due to reflection of thermal energy, specular targets are likely to occur in the scene, further limiting the ability to detect IEDs or other concealed weapons.

There is a need to provide a system and method for automatically identifying which individuals within a group of people carry concealed weapons and to do so at a distance to reduce the danger presented by such scenarios.

SUMMARY

One embodiment of the invention described herein is directed to a system for detecting concealed contraband at a distance. The system includes a people tracking video subsystem for creating video of one or more persons and a people tracking decisioning subsystem for segmenting a targeted person from the one or more persons. The system also includes a concealed contraband detection aiming subsystem for obtaining greater information regarding the targeted person and a concealed contraband detection decisioning subsystem for ascertaining whether the targeted person has a concealed weapon.

Another embodiment of the invention is a method for detecting concealed contraband at a distance. The method includes tracking a person of interest, obtaining a first set of data about the person of interest through video surveillance, and obtaining a second set of data about the person of interest through surveillance of the person of interest with at least another modality. The method also includes fusing the first set of data with the second set of data to form feature vectors and passing the feature vectors through a threat analyzer to ascertain whether the person of interest is carrying concealed contraband.

These and other advantages and features will be more readily understood from the following detailed description of preferred embodiments of the invention that is provided in connection with the accompanying drawings.

DETAILED DESCRIPTION OF PREFERRED EMBODIMENTS

Figure 1:
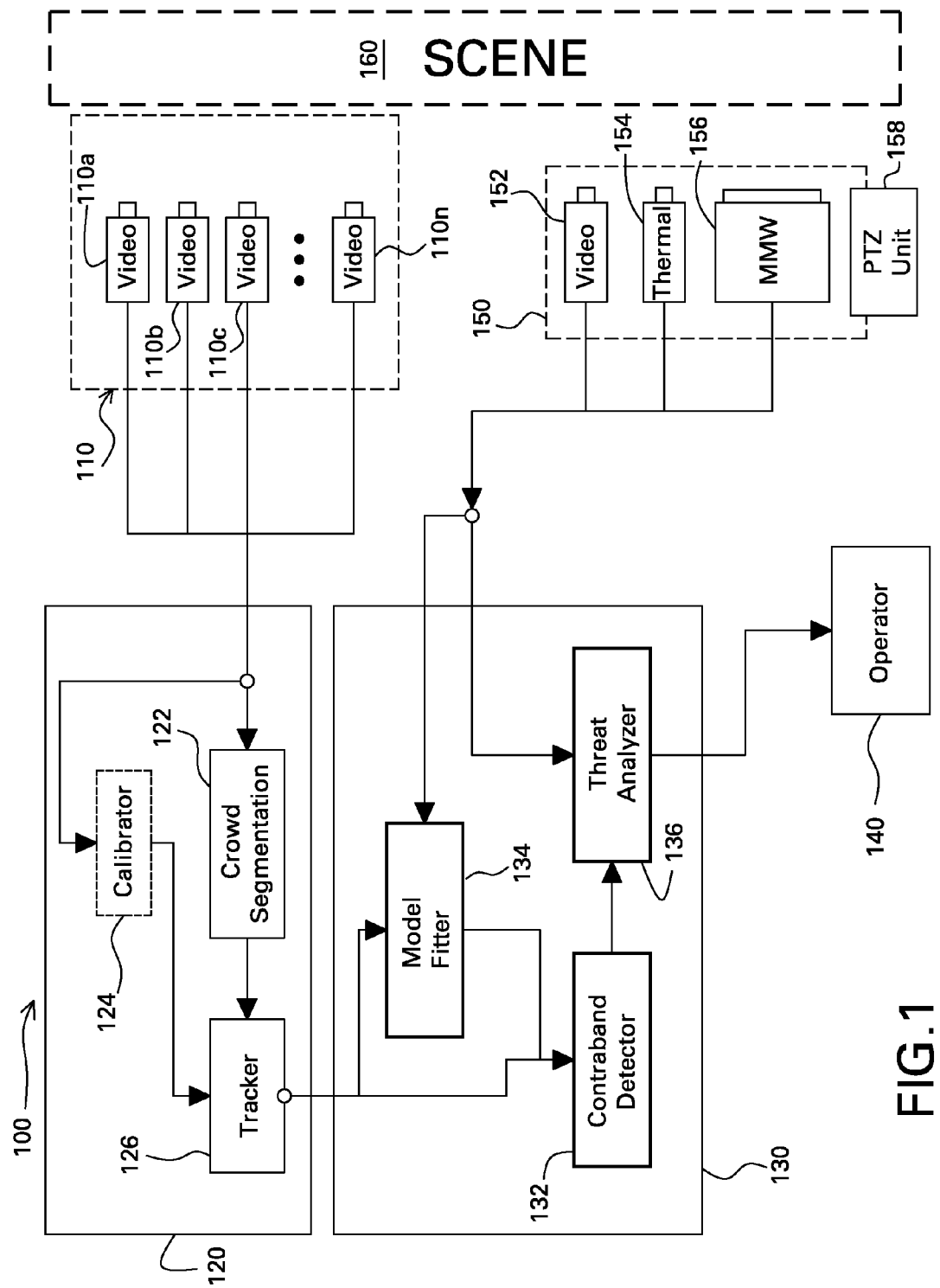
FIG. 1 is a schematic view of a standoff detection system in accordance with an embodiment of the invention.

Referring to FIG. 1 there is shown a standoff detection system 100 that includes a people tracking video subsystem 110, a people tracking decisioning subsystem 120, a concealed contraband detection decisioning subsystem 130, and a concealed contraband aiming subsystem 150. The standoff detection system 100 is capable of detecting and identifying concealed contraband, such as, for example, improvised explosives devices (IEDs) and weapons.

The general approach is to utilize the people tracking video subsystem 110 and the people tracking decisioning subsystem 120 to identify and track individuals of interest. The video subsystem 110 is capable of identifying and tracking multiple subjects that pass by the subsystem 110 or a subset of individuals that may be considered of interest to the subsystem 110. An individual may be of interest for any number of reasons, including, for example, body posture and/or language; erratic, furtive or otherwise suspicious movements; gait or stride length and speed; suspicious attire, such as heavy or long coats on warm days; bulkiness of clothing; prolonged failure to establish eye contact; responses to verbal and non-verbal challenges that are overly influenced by the autonomic nervous system; and, the reactions of other people in the vicinity that are attuned to strange or erratic behavior. Additionally, the person of interest may be such a person, not due to any suspicious behavior, but merely by his presence. Once a person of interest is identified, the people tracking video subsystem 110 and the people tracking decisioning subsystem 120 is used to track the person of interest. Once the person of interest is identified and tracked to a particular area, the concealed contraband detection decisioning subsystem 130 and the concealed contraband aiming subsystem 150 are used to focus in on particular regions on the person of interest to ascertain whether concealed contraband, such as an IED or a weapon, is present.

The people tracking video subsystem 110 includes a plurality of video cameras 110*a-n*. The video cameras 110*a-n* may be analog or digital. If analog, it should be appreciated that an analog-to-digital converter be included to allow transmission of digital signals from the people tracking video subsystem 110 to the people tracking decisioning subsystem 120. An example of suitable video cameras 110*a-n* includes the Legend 26x Day/Night Cameras manufactured by the General Electric Company.

The people tracking decisioning subsystem 120 includes a crowd segmenter 122, a calibrator 124, and a tracker 126. The crowd segmenter 122 is an algorithm or set of algorithms designed to separate a crowd of people into distinct individuals. An example of a suitable crowd segmenter 122 may be found in U.S. patent application publication number 2005/0254546, entitled "System and Method for Segmenting Crowded Environments into Individual Objects", published Nov. 17, 2005, assigned to General Electric Company, the entire contents of which are incorporated herein by reference.

The calibrator 124 serves to calibrate each of the video cameras 110a-n both extrinsically and intrinsically. Through an algorithm or set of algorithms, the calibrator 124 extrinsically calibrates by calibrating the network of video cameras 110a-n in space. The calibrator 124 also intrinsically calibrates by determining, for example, the focal length and the piercing point of each of the video cameras 110a-n. The calibration of the video cameras 110a-n provides further data which can be used to identify and track a particular individual. An example of a suitable camera calibrator 124 may be found in U.S. patent application publication number 2005/0071105, entitled "Method and System for Calibrating Relative Fields of View of Multiple Cameras", published Mar. 31, 2005, assigned to General Electric Company, the entire contents of which are incorporated herein by reference.

The tracker 126 is an algorithm or set of algorithms for tracking an identified individual. The tracker 126 is capable of ascertaining the three-dimensional coordinates of an individual in a scene 160, as well as a prediction of where that individual is going. In a scenario where there are multiple people among which to choose a single individual, the tracker 126 also includes a decisioning subroutine that will determine a priority of targets to track. The priority determination may be based on, for example, the prediction of where the individuals are moving. For example, a priority determination may be given to one individual potential target that is likely, based on his direction and speed, to reach a particular point within the scene 160. Such a point may be the point at which the concealed contraband aiming subsystem 150 and the concealed contraband detection decisioning subsystem 130 can best ascertain whether the individual has concealed contraband.

The tracker 126 forwards the three-dimensional coordinates of the priority individual to the concealed contraband detection decisioning subsystem 130. The concealed contraband detection decisioning subsystem 130 includes a concealed contraband detector 132, a model fitter 134, and a threat analyzer 136. More particularly, the tracker 126 forwards the three-dimensional coordinates of the priority individual to the concealed contraband detector 132 and the model fitter 134.

The model fitter 134 is an algorithm or set of algorithms designed to take in information about the priority individual from the tracker 126 to create body part segmentation images of that individual. The model fitter 134 takes in imagery and its attendant sensed data from the concealed contraband detection aiming subsystem 150 to formulate body part segmentation images of the priority individual, and passes these segmentation images to the concealed contraband detector 132. An example of a suitable model fitter 134 may be found in U.S. patent application Ser. No. 11/478,049, entitled "Method and System for Performing Image Re-Identification", filed Jun. 27, 2006, assigned to General Electric Company, the entire contents of which are incorporated herein by reference.

The concealed contraband detection aiming subsystem 150 includes various imaging or non-imaging detection devices. For example, and as illustrated in FIG. 1, the concealed contraband detection aiming subsystem 150 includes a video camera 152, a thermal imager 154, and a millimeter wave (MMW) imager 156. A suitable MMW imager 156 includes the iSPO-30 imagers manufactured by QinetiQ, Ltd. Each of these imagers 152, 154, 156 is controlled with a pan-tilt-zoom unit 158. Each of these imaging modalities is capable of retrieving data about a targeted individual. For example, the video camera 152 is capable of retrieving electro-optical imagery of the targeted individuals. The thermal imager 154 is capable of retrieving heat sensitive imagery. The MMW imager 156 is capable of retrieving millimeter wave imagery that can penetrate clothing.

Instead of imagers, radiometric and radar detectors that are non-imaging sensors may be utilized to extract and retrieve data about a targeted individual. The detectors may be passive, such as a passive MMW single or low pixel-count radiometer or radar detector, or a passive terahertz radiometer or radar detector. Alternatively, the detectors may be active, such as an active radar-based detector, an active MMW radiometer detector, an active terahertz detector, and a detector capable of illumination, like a laser. Utilizing non-imaging detectors eliminates the algorithms that are required to analyze an image-based modality.

The imagery retrieved by the concealed contraband detection aiming subsystem 150 is transmitted to the model fitter 134, which takes the imagery and determines the three-dimensional coordinates of various body parts of the priority individual, creating body part segmentation images of the priority individual. The concealed contraband detector 132 fuses the body part segmentation images of the priority individual created by the model fitter 134 with the three-dimensional coordinates of the priority individual received from the tracker 126. After fusing the body part segmentation images of the priority individual with the three-dimensional coordinates of the priority individual, the concealed contraband detector 132 extracts feature vectors based on the spatial and sensing information. Examples of various features are the output of linear filter banks that are spatially registered. Thus, instead of merely raw images, the concealed contraband detector 132 provides a registered feature-based representation of the images, and it can do so over time.

The feature vectors created by the concealed contraband detector 132 are forwarded to the threat analyzer 136. The threat analyzer 136 is an algorithm or set of algorithms that form a machine learning classification engine, for example, a support vector machine. Such an engine generally classifies objects as being of a certain type or as being not of a certain type. For example, and with particular relevance to the standoff detection system 100, the threat analyzer 136 classifies objects as either being threats or non-threats. The threat analyzer 136 is initially uploaded with characteristic data of specific threats and non-threats. If the data from the feature vectors forwarded to the threat analyzer 136 are similar enough to either the threat bins or the non-threat bins, the threat analyzer 136 will classify the feature vectors in the appropriate bin. If the data from the feature vectors is similar enough to data within the threat bins, an alert will be forwarded to an operator 140, who can initiate proper procedures for detaining the priority individual and inspecting the priority individual in a safe manner. If the data from the feature vectors is inconclusive, or the threat analyzer 136 does not have data to compare with the feature vectors data, then the threat analyzer 136 will also forward an alert to the operator 140, who can initiate proper procedures for detaining the priority individual and inspecting the priority individual in a safe manner. Once a determination is made, the new feature vectors can be included in the appropriate bins of the threat analyzer 136, thus allowing the threat analyzer 136 to learn over time.

Figure 2:
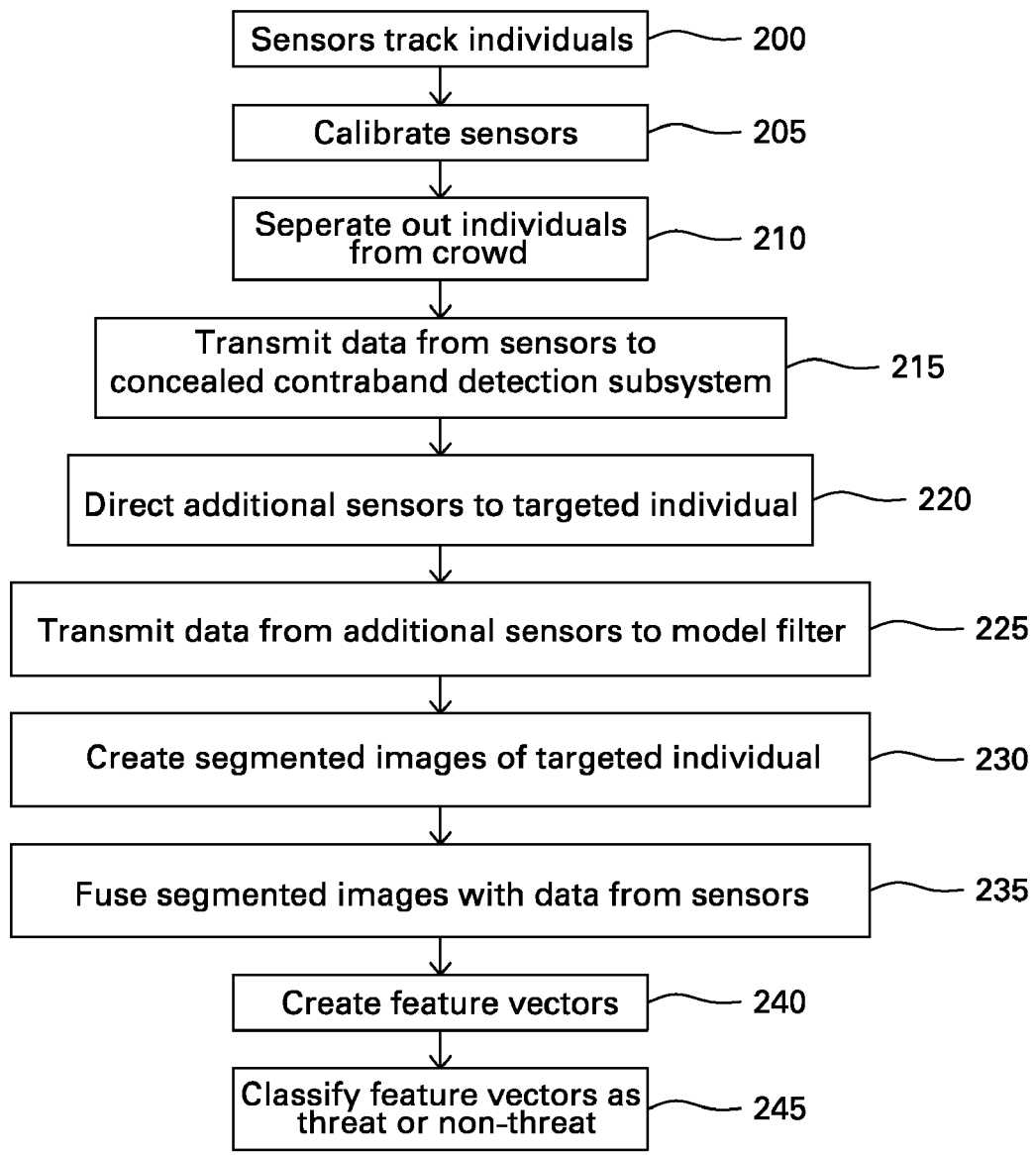
FIG. 2 illustrates process steps for determining whether an individual has a concealed weapon in accordance with an embodiment of the invention.

Next, and with reference to FIGS. 1 and 2, will be described a process for detecting concealed contraband, such as IEDs or other weapons. At Step 200, a network of video sensors, such as the video cameras 110a-n, track one or more individuals in a scene 160. Step 200 may include the use of computer vision algorithms in a tracking algorithm, for example, the tracker 126, to track the individuals. At Step 205, the video sensors are all calibrated, via a calibration algorithm, for example, the calibrator 124, in space so that the individuals can be located and assigned dynamic three-dimensional coordinates. At Step 210, crowd segmentation algorithms are used, in the crowd segmenter 122, to separate out individuals within a crowd.

The imagery created through the tracking of individuals at Step 200 is used in ascertaining whether one targeted individual is carrying concealed contraband. Specifically, at Step 215, the imagery created through the tracking of individuals at Step 200, including the three-dimensional coordinates of a targeted individual, is transmitted to a concealed contraband detecting subsystem, such as the concealed contraband detection decisioning subsystem 130, and specifically to the tracker 126. At Step 220, additional sensors are directed toward the targeted individual. Specifically, the sensors and/or imagers within the concealed contraband detection aiming subsystem 150 are directed toward the targeted individual using the three-dimensional coordinates of the targeted individual.

At Step 225, the imagery and data transmitted from the sensors and or imagers within the concealed contraband detection aiming subsystem 150 is transmitted to a model-fitting algorithm, such as the model fitter 134. At Step 230, the model fitter 134 receives the imagery and data and determines the three-dimensional coordinates of various body parts of the targeted individual, creating body part segmentation images of the targeted individual. At Step 235, the image segmentations of the targeted individual's various body parts are fused with the three-dimensional coordinates of the targeted individual received from the tracker 126 at a concealed contraband detection subsystem, such as the concealed contraband detector 132. By fusing the body part segmentation images of the targeted individual with the three-dimensional coordinates of the priority individual, the concealed contraband detector 132 creates feature vectors. Thus, instead of merely raw images, the concealed contraband detector 132 provides a registered feature-based representation of the images.

At Step 240, feature vectors are created by the concealed contraband detector 132 and are forwarded to a threat analyzing algorithm, such as the threat analyzer 136. The threat analyzer 136 classifies objects as being either threats or non-threats at Step 245.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A system for detecting concealed contraband at a distance, comprising:

a people tracking video subsystem for creating video of one or more persons;

a people tracking decisioning subsystem for segmenting a targeted person from the one or more persons;

a concealed contraband detection aiming subsystem for obtaining greater information regarding the targeted person, wherein said concealed contraband detection aiming subsystem comprises a network of a plurality of active detectors, wherein said plurality of active detectors comprise at least two modalities from the group consisting of active radars, active millimeter wave radiometer detectors, active terahertz radiometer detectors, and lasers; and a concealed contraband detection decisioning subsystem for ascertaining whether the targeted person has a concealed weapon.

2. The system of claim 1, wherein said people tracking video subsystem comprises a network of video cameras, each transmitting video to said people tracking decisioning subsystem.

3. The system of claim 2, wherein said video cameras comprise digital video cameras.

4. The system of claim 2, wherein said people tracking decisioning subsystem comprises a calibrator for calibrating each of the video cameras in three-dimensional space, wherein a three-dimensional location of the targeted person can be ascertained.

5. The system of claim 1, wherein said people tracking decisioning subsystem comprises a crowd segmenter for segmenting individuals out of a crowd of people.

6. The system of claim 1, wherein said people tracking decisioning subsystem comprises a tracker for tracking the targeted person.

7. The system of claim 1, wherein said concealed contraband detection aiming subsystem comprises a network of imagers, said network of imagers including at least two modalities of imaging.

8. The system of claim 7, wherein said network of imagers comprises a millimeter wave imager and at least one of a video camera and a thermal imager.

9. The system of claim 1, wherein said concealed contraband detection aiming subsystem comprises a network of non-imaging detectors.

10. The system of claim 9, wherein said network of non-imaging detectors comprises a plurality of passive detectors.

11. The system of claim 10, wherein said plurality of passive detectors comprise at least two modalities from the group consisting of passive millimeter wave single and low pixel-count radiometer detectors and passive terahertz radiometer detectors.

12. The system of claim 1, wherein said concealed contraband detection decisioning subsystem comprises a model fitter for creating articulated images of body parts of the targeted person.

13. The system of claim 12, wherein said concealed contraband detection decisioning subsystem comprises a concealed contraband detector for creating feature vectors extracted from imagery associated with the targeted person.

14. The system of claim 13, wherein said concealed contraband detection decisioning subsystem comprises a threat analyzer for classifying the feature vectors as being a concealed weapon of as not being a concealed weapon.

15. A method for detecting concealed contraband at a distance, comprising:

tracking a person of interest;

obtaining a first set of data about the person of interest through video surveillance;

obtaining a second set of data about the person of interest through surveillance of the person of interest with at least another modality, wherein said obtaining a second set of data comprises obtaining the second set of data through at least one passive detector, wherein said at least one passive detector comprises a passive millimeter wave single or low pixel-count radiometer detector and a passive terahertz radiometer detector;

fusing said first set of data with said second set of data to form feature vectors; and passing the feature vectors through a threat analyzer to ascertain whether the person of interest is carrying concealed contraband.

16. The method of claim 15, wherein said tracking a person of interest comprises tracking the person of interest with at least one video camera.

17. The method of claim 16, wherein said obtaining a first set of data comprises obtaining at least a three-dimensional location of the person of interest.

18. The method of claim 17, wherein the three-dimensional location of the person of interest is obtained through calibrating the at least one video camera.

19. The method of claim 15, wherein said obtaining a second set of data comprises obtaining the second set of data through imaging surveillance of the person of interest.

20. The method of claim 19, wherein said imaging surveillance comprises surveillance of the person of interest with at least one from the group consisting of video cameras, terahertz imagers, thermal imagers, and millimeter wave imagers.

21. The method of claim 15, wherein said obtaining a second set of data comprises obtaining the second set of data through non-imaging detectors.

22. The method of claim 21, wherein said non-imaging detectors comprise at least one active detector.

23. The method of claim 22, wherein said at least one active detector comprises an active millimeter wave detector, an active terahertz detector, and a laser.

24. The method of claim 15, wherein said fusing comprises fusing body part segmentation images of the person of interest with three-dimensional location data of the person of interest to obtain information on the three-dimensional location of various body parts of the person of interest.

* * * * *

UNITED STATES PATENT AND TRADEMARK OFFICE
CERTIFICATE OF CORRECTION

| | | |
|---|---|---|
| PATENT NO. | : 7,885,429 B2 | Page 1 of 1 |
| APPLICATION NO. | : 11/759683 | |
| DATED | : February 8, 2011 | |
| INVENTOR(S) | : Tu et al. | |

It is certified that error appears in the above-identified patent and that said Letters Patent is hereby corrected as shown below:

On the Title Page, item (56), under "FOREIGN PATENT DOCUMENTS", in
Column 2, Line 3, delete "WO2006056190 A2" and insert -- WO2006053190 A2 --, therefor.

Signed and Sealed this
Ninth Day of August, 2011

David J. Kappos
*Director of the United States Patent and Trademark Office*